(12) United States Patent
Nakamura et al.

(10) Patent No.: US 6,855,419 B2
(45) Date of Patent: Feb. 15, 2005

(54) POLYMER THIN FILM, ITS PRODUCTION METHOD, BINDER FOR BIO CHIP, BIO CHIP, AND ITS PRODUCTION METHOD

(75) Inventors: Eiichi Nakamura, Tokyo (JP); Kenichi Shibayama, Tokyo (JP); Hiroshi Maruyama, Chiba (JP); Takashi Inoue, Chiba (JP)

(73) Assignee: Kishimoto Sangyo Co., Ltd., Osaka (JP)

( * ) Notice: Subject to any disclaimer, the term of this patent is extended or adjusted under 35 U.S.C. 154(b) by 303 days.

(21) Appl. No.: 10/145,738

(22) Filed: May 16, 2002

(65) Prior Publication Data

US 2003/0012956 A1 Jan. 16, 2003

(30) Foreign Application Priority Data

May 16, 2001 (JP) ........................................ 2001-146675
Jan. 21, 2002 (JP) ........................................ 2002-011707

(51) Int. Cl.$^7$ ............................ B32B 19/00; B32B 9/04
(52) U.S. Cl. .................................... 428/357; 428/411.1
(58) Field of Search .............................. 428/357, 411.1

(56) References Cited

U.S. PATENT DOCUMENTS

| | | |
|---|---|---|
| 3,375,419 A | 3/1968 | Wagener et al. |
| 5,393,533 A | 2/1995 | Versic |
| 6,123,993 A | 9/2000 | Xu et al. |

FOREIGN PATENT DOCUMENTS

| | | |
|---|---|---|
| EP | 0 312 025 | 4/1989 |
| WO | WO 99/30823 | 6/1999 |

OTHER PUBLICATIONS

J. Lahann et al., Macromolecules, vol. 35, No. 11, pp. 4380–4386, XP–002208557, "Novel Poly(p–xylylenes): Thin Films with Tailored Chemical and Optical Properties", 2002.

J. Lahann, et al., Mat.–Wiss. U. Werkstofftech., vol. 30, pp. 763–766, "CVD–Beschichtung MIT Einem Funktionalisierten Poly–P–Xylylen—Ein Universell Anwendbares Verfahren Zur Ausruestrung von Medizinimplantaten Mit Wirkstoffen" (CVD–Polymerization of a Functionalized Poly(P–Xylylene)—A Generally Applicable Method for the Immobilization of Drugs on Medical Implants), 1999 (with English Abstract).

(List continued on next page.)

Primary Examiner—Jezia Riley
(74) Attorney, Agent, or Firm—Oblon, Spivak, McClelland, Maier & Neustadt, P.C.

(57) ABSTRACT

This invention attempts to provide a method for producing a DNA chip which can be accomplished in simple steps at a low cost, and wherein use of the resulting DNA chip reduces loss of probes and sample substances in the washing step enabling efficient use of such probe and sample. This invention also attempts to provide a DNA chip produced by such method. Accordingly, a method for producing a DNA chip comprising a substrate and a DNA-binding layer formed on the substrate wherein said DNA-binding layer is a diamond like film having a DNA-binding group is provided, and this method comprises the steps of: reducing pressure of a vacuum chamber to a predetermined degree of vacuum; feeding the chamber with a gas which is the source of said diamond like film; feeding the chamber with a gas which is the source of nitrogen; and forming the diamond like film having a DNA-binding group on the substrate by CVD. Also provided is the DNA chip produced by such method.

12 Claims, 3 Drawing Sheets

OTHER PUBLICATIONS

J. Lahann, et al., Macromol. Rapid Commun., vol. 19, No. 9, pp. 441–444, "Chemical Vapour Deposition Polymerization of Substituted [2.2]Paracyclophanes", 1998.

P. Schooler, et al., J. Chem. Soc., Dalton Trans. pp. 559–563, "Synthesis and Characterisation of Amino and Bromo Ring Substituted Derivatives of $[Ru_6C(CO)_{14}L]$ (L=[2.2]Paracyclophane)", 1999.

J. Lahann, et al., Angew. Chem. Int. End., vol. 40, No. 4, pp. 726–728, "Synthesis of Amino [2.2]Paracyclophanes–Beneficial Monomers for Bioactive Coating of Medical Implant Materials", 2001.

J. Lahann, et al., Biomaterials, vol. 22, pp. 817–826, "Bioactive Immobilization of R–Hirudin on CVD–Coated Metallic Implant Devices", 2001.

POLYMER THIN FILM, ITS PRODUCTION METHOD, BINDER FOR BIO CHIP, BIO CHIP, AND ITS PRODUCTION METHOD

BACKGROUND OF THE INVENTION

This invention relates to a novel polymer thin film adapted for use in the fields of laboratory testing, medicine, and the like; its production method; and a bio chip utilizing such polymer thin film which is adapted for use in assaying gene expression, gene mutation, gene polymorphism, and the like.

Some devices such as a catheter employed in the field of medicine are used by insertion into a body. Introduction of a medical device which is a foreign matter to the body is associated with the problem of compatibility with the biological systems in the body such as immune and defense mechanisms of the body.

For example, thrombosis is one of the most serious problems associated with the development and use of medical devices such as blood collecting and treating systems. When the blood becomes in contact with the surface of a foreign matter, the liquid content and the cells of the blood undergo some change. To improve the biocompatibility of such devices, immobilization of an anticoagulant or immobilization of a biologically active antithrombogenic agent on the polymer surface is required.

Expression of genes in cells and tissues has been assayed by Northern blotting (or dot blotting) wherein RNA from various cells or tissues is immobilized on the membrane, and the RNA is hybridized by using a probe specific to the analyte gene; RT-PCR using a primer specific to the analyte gene; or the like.

There is also a demand for an assay wherein a large number of genes are assayed at once reflecting the progress in gene researches and associated increase in the number of analyte genes as well as progress of the Genome Project and application of its outcome in the field of medicine.

In view of such demands, various techniques have been developed that utilize microarray, DNA chip, and the like. Such techniques share the common feature that several thousands DNA fragments of different types are immobilized on a glass substrate (which is referred to as a DNA chip or a bio chip), and the target DNA fragment is detected at a high sensitivity by means of a reaction between the immobilized DNA fragment and the very minute amount of labeled target DNA fragment.

Such procedures have enabled to assay a large number of genes of human and other mammals or even the entire genes of a microorganism having several thousand genes on several bio chips. Also enabled are assays of the amount gene expression for the entire genes by using labeled RNAs. Assay of mutation such as gene deletion has also been enabled by labeling the genomic DNA.

When a bio chip is produced by a procedure other than the "on chip" synthesis (i.e. the procedure wherein the DNA fragments to be immobilized on the surface of the substrate are directly synthesized on the surface of the substrate), the DNA fragments that had been produced beforehand are spotted on the surface of the substrate, and immobilized by utilizing electrostatic interactions or covalent bonding.

FIG. 2 is a view explaining the principle of this procedure. FIG. 2 STEP (A) shows a microplate 22 with probe DNAs 21 of different types placed in the microplate. In the meanwhile, a glass plate as shown in FIG. 2 STEP (B) is prepared for uses as a plate 23, and as shown FIG. 2 STEP (C), the surface of the plate 23 is coated with a binder 24 such as poly-l-Lysine which binds the DNA to the glass.

Next, the probe DNA 21 in the microplate 22 is attached to a pin, and the DNA 21 attached on the pin is brought in contact with the glass plate 23 that had been coated with the binder (poly-l-Lysine) 24 of the DNA and the glass for spotting of the DNA on the coated glass. This procedure is repeated until the spotting of all probe DNA in the microplate 22 has been completed, and a bio chip shown in FIG. 2 STEP (D) is thereby produced. As described above, bio chips have been produced by preliminarily coating the entire surface of a plate with a binder of the DNA and the glass, and thereafter spotting the DNA on the plate coated with the binder.

The hybridization of the bio chip is accomplished by placing the bio chip wherein the probe DNAs have been spotted on the glass plate by means of the binder with the sample DNA that had been labeled with a fluorescent substance in a hybridization solution to thereby promote the hybridization. The hybridization solution is a mixed solution comprising formaldehyde, SSC (NaCl, trisodiumcitrate), SDS (sodium dodecyl sulfate), EDTA (ethylenediamidetetraacetic acid), distilled water, and the like, and mixing ratio may vary depending on the character of the DNA used.

In this step, the sample DNA and the probe DNA will bind to each other on the bio chip by forming a double helix structure if these DNAs have complementary strands. On the other hands, the DNAs will not bind to each other if the DNAs are not complimentary to each other, and the sample DNA that had been labeled with a fluorescent substance either remains in the hybridization solution or becomes bound to the binder coated on the glass plate to remain as a garbage.

When the glass plate is washed in a water tank or the like to thereby remove the sample DNA that had been labeled with a fluorescent substance remaining on the glass plate, the sample DNA that failed to bind to the probe DNA is washed away. The hybridization is then detected by exciting the fluorescent substance that had been used for labeling the sample DNA and that became bonded to the probe DNA by the light energy emitted from the predetermined light source, and scanning the light emitted by the excitation of the fluorescent substance using a photosensor such as CCD.

However, the binder of the DNA and the glass such as poly-l-Lysine is insufficient in the binding strength with the DNA, and the probe DNA often became detached from the substrate together with the hybridized sample. The loss of the probe DNA and the sample DNA due to such insufficient binding often reached as high as 70% mass ratio, and it has been the state of art that the expensive probe DNA and the precious sample DNA are being wasted.

In order to obviate such problem, various materials have been examined for use as a binder. In spite of such attempts, no material has so far been found effective.

SUMMARY OF THE INVENTION

An object of the present invention is to provide a polymer thin film which is useful as a substrate for immobilizing a histocompatibility-imparting agent, an immunosuppressive agent, a bioreaction suppressive agent, or the like, and which can be used in imparting biocompatibility; its production method; a binder for a bio chip wherein loss of probe and sample substances in the washing step has been reduced to realize efficient use of such probe and sample; and its production method.

The object as described above is achieved by the present invention which is constituted as described below.

(1) A method for producing a polymer thin film comprising the steps of:

evaporating and heating a starting material represented by the following structural formula (A-I):

(A-I)

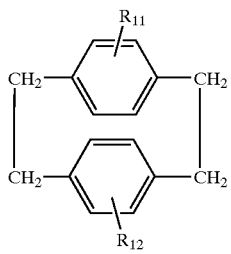

wherein $R_{11}$ and $R_{12}$ independently represent —$CH_2NH_2$ group or H, and at least one of the $R_{11}$ and $R_{12}$ is —$CH_2NH_2$ group, to bring the material in the form of a monomer; and introducing the heated material into a vacuum deposition chamber maintained at a predetermined degree of vacuum to deposit and polymerize the monomer on a substrate to thereby produce the polymer thin film.

(2) A polymer thin film formed on a substrate wherein said polymer thin film at least comprises a compound having the following structural unit (A-II):

(A-II)

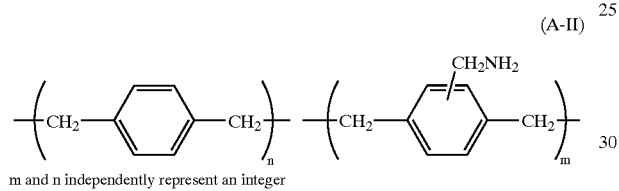

m and n independently represent an integer (3) A bio chip comprising a substrate and the polymer thin film of the above (2) formed on the substrate as a binder-containing layer.

(4) The bio chip according to the above (3) wherein said binder of said bio chip has a probe substance bonded thereto.

(5) The bio chip according to the above (3) or (4) wherein said binder-containing layer has been formed by vacuum deposition.

(6) The bio chip according to any one of the above (3) to (5) wherein said binder-containing layer is formed with a pattern by means of masking.

(7) A binder for a bio chip which is represented by the following formula (B-I):

(B-I)

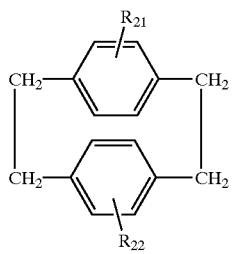

wherein $R_{21}$ and $R_{22}$ independently represent —$NH_2$ group or H, and at least one of the $R_{21}$ and $R_{22}$ is —$NH_2$ group, (8) A bio chip comprising a substrate and a binder-containing layer formed on the substrate, said binder-containing layer comprising at least a polymer binder having the following structural unit (B-II):

(B-II)

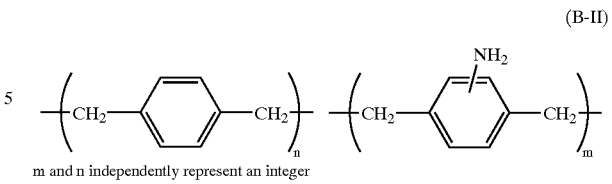

m and n independently represent an integer (9) The bio chip according to the above (8) wherein said binder has a probe DNA bonded thereto.

(10) The bio chip according to the above (8) or (9) wherein said binder-containing layer has been formed by vacuum deposition.

(11) The bio chip according to any one of the above (8) to (10) wherein said binder-containing layer is formed with a pattern by means of masking.

(12) A method for producing a bio chip comprising a substrate and a binder-containing layer comprising the steps of:

evaporating and heating a starting material represented by the following structural formula (B-I):

(B-I)

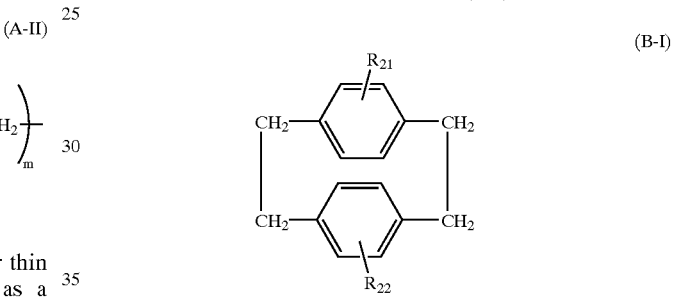

wherein $R_{21}$ and $R_{22}$ independently represent —$NH_2$ group or H, and at least one of the $R_{21}$ and $R_{22}$ is —$NH_2$ group, to bring the material in the form of a monomer; and introducing the heated material into a vacuum deposition chamber maintained at a predetermined degree of vacuum to deposit and polymerize the monomer on the substrate to thereby form the binder-containing layer.

DESCRIPTION OF THE PREFERRED EMBODIMENTS

First Aspect

Figure 1:
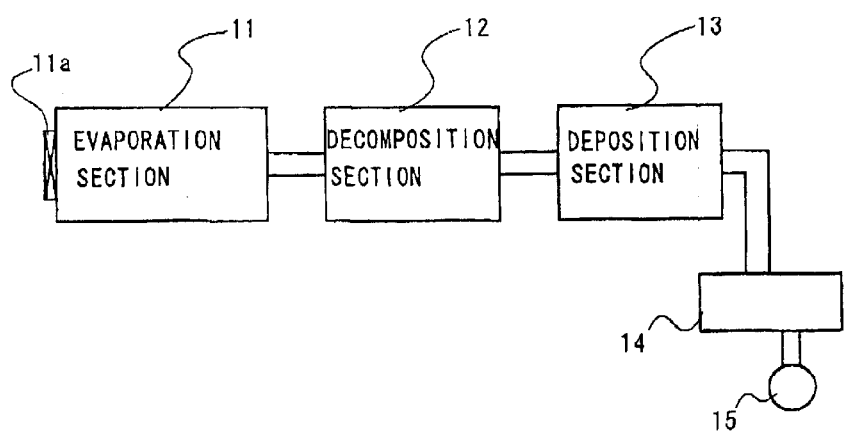
FIG. 1 is a block diagram schematically illustrating the system for producing the bio chip of the present invention.

The polymer thin film according to the first aspect of the present invention may be produced by evaporating and heating a starting material represented by the following structural formula (A-I):

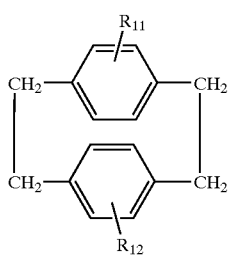

(A-I)

to bring the material in the form of a monomer; and introducing the heated material into a vacuum deposition chamber maintained at a predetermined degree of vacuum to deposit and polymerize the monomer on a substrate to thereby produce the polymer thin film.

In the formula (A-I), $R_{11}$ and $R_{12}$ may independently represent —$CH_2NH_2$ group or H, and at least one of the $R_{11}$ and $R_{12}$ is —$CH_2NH_2$ group. Both the $R_{11}$ and $R_{12}$ may represent —$CH_2NH_2$ group.

When such compound is used for the starting material, and this starting material is evaporated for deposition and polymerization on the substrate, there is obtained a polymer thin film having the structural unit represented by the following structural formula (A-II):

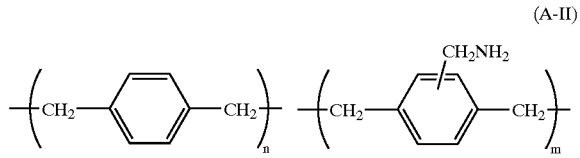

(A-II)

In the formula (A-II), n and m are independently an integer, and n may be 0 while m is not 0. m/m+n is preferably near 1 since the amount of the —$CH_2NH_2$ group in the film increases as the m/m+n approaches 1. The value of the m/m+n, however, is not particularly limited.

When such polymer thin film is formed on a substrate, the substrate will efficiently function as a substrate for immobilizing a histocompatibility-imparting agent, an immunosuppressive agent, a bioreaction suppressive agent, or the like, and as a substrate which can be used for imparting biocompatibility; and various biochemical substances, proteins, probes, and the like can be reliably immobilized on this substrate. Accordingly, a biocompatible device can be produced when this polymer film is formed on the surface of a medical device and an immunosuppressive agent, an antithrombogenic agent, or the like is immobilized on the thus formed polymer film.

In addition, when such polymer thin film is formed on an adequate base material, substrate, or the like, there can be obtained a bio chip wherein loss of probe and sample substances in the washing step has been reduced to realize efficient use of such probe and sample.

In this bio chip, a more reliable bonding between the substrate and the probe, and in particular, between the substrate and the DNA is enabled such that the probe and the sample are retained on the substrate through the washing step to enable an efficient use of the probe and the sample.

The compound of this invention represented by the structural formula (A-I) is preferably evaporated/decomposed and polymerized/deposited on the substrate by vapor deposition, and in particular, by CVD. A firm bond between the compound and the substrate comprising a glass or the like is thereby established simultaneously with an improved immobilization of the probe to the substrate by the bonding of the amino group ($NH_2$) in the structural formula to the probe. When the probe comprises a DNA, a particularly improved immobilization of the probe DNA to the substrate is established by the binding of the amino group to the phosphate group ($PO_4$) of the probe DNA fragment.

Furthermore, the amino group is bonded to the xylylene backbone by an intervening methylene group (—$CH_2$—), and as a consequence, a higher basicity is attained compared to the case when the amino group is directly bonded to the backbone. A stronger electrostatic bond is thereby established between the compound of this invention and the DNA or the like.

The compound of the formula (A-I) may be produced, for example, by the procedure as described below.

First, [2,2]-paracyclophane is brominated in a solvent such as methylene chroride by adding bromine dropwise in the presence of a catalyst such as iron or iodine with optional cooling. The reaction is monitored by gas chromatography, and the reaction is terminated when the predetermined composition is achieved, and the excessive bromine is neutralized with aqueous sodium sulfite solution or the like. The solvent is then distilled off, and the remaining crystal is purified by recrystallization to obtain bromo-[2,2]-paracyclophane.

The resulting bromo-[2,2]-paracyclophane is reacted with a slightly excessive amount (an amount slightly more then the equivalent amount) of copper cyanide with heating in a solvent such as N-methylpyrrolidone at 200 to 250° C. Aqueous ammonia is then added for dissolution of the copper compound as well as precipitation of the target product. The thus obtained crude crystal is purified by recrystallization and/or sublimation to thereby produce cyano-[2,2]-paracyclophane.

Next, the cyano-[2,2]-paracyclophane is reduced by catalytic reduction or by reduction in tetrahydrofuran or other solvent in the presence of lithium aluminum hydride or other reducing agent to thereby produce aminomethyl-[2,2]-paracyclophane.

The resulting aminomethyl-[2,2]-paracyclophane represented by the structural formula (A-I) can be deposited on a substrate in the form of a polymer film, for example, by means of chemical vapor deposition as described below.

First, a vapor deposition system comprising an evaporation section 11, a decomposition section 12, and a deposition section 13 as shown in FIG. 1 is prepared. In FIG. 1, the evaporation section 11 has an inlet shutter 11a for introducing the evaporation material, and the evaporation section 13 is connected to a vacuum pump 15 via a trap 14.

In such vapor deposition system shown of FIG. 1, monoaminomethyl-[2,2]-paracyclophane in solid form (the evaporation material) is first introduced in the evaporation section 11. When the temperature of the evaporation section 11 is raised to the vaporization temperature of the monoaminomethyl-[2,2]-paracyclophane, and preferably, to a temperature in the range of 80 to 200° C., and in particular, 100 to 180° C., the evaporation material turns into a dimer gas, and the gas of the starting material is thereby produced.

Next, this dimer gas of the starting material is introduced into the decomposition section 12. In the decomposition section 12, the thus introduced gas of the starting material is heated to its decomposition temperature, and preferably, to a temperature in the range of 600 to 750° C., and in particular, to 650 to 700° C. to thereby decompose the gas of the starting material into a monomer gas.

The thus produced monomer gas of the starting material is then introduced into the evaporation chamber 13, which is maintained at the predetermined degree of vacuum, and preferably, at 10 to 50 mTorr, and in particular, 20 to 35 mTorr. When the introduced gas of the starting material becomes in contact with the substrate, polymerization of the starting material takes place at the interface, and the polymer film is thereby produced.

The polymer obtained as described above is the one represented by the following structural formula (A-II):

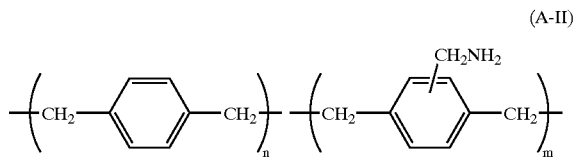

(A-II)

wherein m and n are independently an integer, and n may be 0.

The thus formed polymer film may have a thickness corresponding to one molecule. The polymer film, however, may typically have a thickness of 0.05 to 10 μm, and preferably about 0.1 to 1 μm. It is to be noted that this thin film may be deposited on a film formed from [2,2]-paracyclophane or chloro-[2,2]-paracyclophane.

In the vapor deposition of the polymer film, the polymer film may also be formed in the predetermined pattern by using a mask corresponding to such predetermined pattern. Use of such mask enables a highly accurate formation of the binder-containing layer in the predetermined pattern so that attachment of the probe or specimen, for example, the DNA to the undesired part and remaining of such substance as a garbage can be prevented. Decrease in the S/N induced by such garbage is thereby avoided.

The polymer film of the present invention is useful as a substrate for immobilizing a histocompatibility-imparting agent, an immunosuppressive agent, a bioreaction suppressive agent, or the like, and it can be used in imparting biocompatibility. This polymer film is also adapted for use in a bio chip as a substrate for immobilizing a DNA and other probe substance. Exemplary histocompatibility-imparting agents, immunosuppressive agents, bioreaction suppressive agents, and probes include proteins, antigens, receptors, DNA fragments, and RNA fragments. The resulting bio chip will exhibit particularly excellent performance when DNA or other genetic substance is immobilized.

A bio chip having the polymer film obtained according to the first aspect of the present invention as the immobilization substrate, namely, as the binding layer exhibits good binding ability with the probe, and accordingly, this bio chip is less likely to experience peeling of the probe in the step of washing and the like, and efficient use of the substances is thereby enabled.

Second Aspect

The binder for a bio chip according to the second aspect of the present invention is the one represented by the following structural formula (B-I):

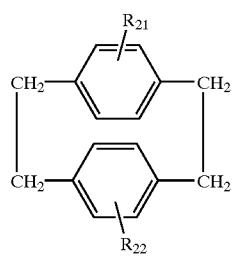

(B-I)

In the formula (B-I), $R_{21}$ and $R_{22}$ independently represent —$NH_2$ group or H, and at least one of the $R_{21}$ and $R_{22}$ is —$NH_2$ group. Both the $R_{21}$ and $R_{22}$ may represent —$NH_2$ group.

When such compound of the present invention is used as a binder, a reliable bond will be achieved between the substrate and the probe DNA, and an efficient use of the probe DNA and the sample DNA will be enabled since the probe DNA and the sample DNA are avoided from being washed off the substrate in the step of washing with water or the like.

The compound of this invention represented by the structural formula (B-I) is preferably evaporated/decomposed and polymerized/deposited on the substrate by vapor deposition, and in particular, by CVD to thereby establish a firm bond with the substrate comprising a glass or the like, and simultaneously, an improved immobilization of the probe DNA to the substrate is established by the bonding between the amino group ($NH_2$) in the structural formula and the phosphate group ($PO_4$) of the probe DNA fragment. It is generally the 5' terminal of the DNA fragment that becomes bonded to the compound of the present invention.

The compound of this invention may be produced, for example, by the procedure as described below.

First, paracyclophane is heated under reflux with glacial acetic acid, and after cooling the reaction system to the predetermined temperature, fuming nitric acid is added dropwise with stirring. The reaction product is then poured into cold water, for example, in ice water. The precipitate is then recovered by filtration, and washed in an alkaline solution, and then, in water.

The resulting crude crystal is extracted from isopropyl ether or other extraction solvent, and the solvent is distilled off the extract. The residue is then recrystallized from methanol to obtain 4-nitro-paracyclophane.

Next, the resulting 4-nitro-paracyclophane is dissolved in a solvent such as toluene, and after adding iron powder, ethanol, and water, the mixture is heated under reflux. Hydrochloric acid solution prepared by diluting concentrated hydrochloric acid with ethanol is then added dropwise to the mixture while heating the mixture under reflux, and the heating under reflux is continued for another several hours. After the completion of the reaction, the reaction product is filtered, and the filtrate is extracted with hydrochloric acid. The extract is neutralized with a neutralizer such as sodium hydroxide. The resulting precipitate is collected by filtration, dried, and the resulting crude crystal is sublimed. The sublimate is mixed with ethanol, and the mixture is heated under reflux. After cooling, the resulting crystal is collected by filtration, and dried to obtain 4-amino-paracyclophane represented by the structural formula (B-I).

The resulting 4-amino-paracyclophane represented by the structural formula (B-I) can be deposited on a substrate as the binder-containing layer, for example, by means of chemical vapor deposition as described below.

First, a vapor deposition system comprising an evaporation section 11, a decomposition section 12, and a deposition section 13 as shown in FIG. 1 is prepared. In FIG. 1, the evaporation section 11 has an inlet shutter 11a for introducing the evaporation material, and the evaporation section 13 is connected to a vacuum pump 15 via a trap 14.

In such vapor deposition system shown of FIG. 1, 4-amino-paracyclophane in solid form (the evaporation material) is first introduced in the evaporation section 11. When the temperature of the evaporation section 11 is raised to the vaporization temperature of the 4-amino-paracyclophane, and preferably, to a temperature in the range of 80 to 200° C., and in particular, 100 to 180° C., the evaporation material turns into a dimer gas, and the gas of the starting material is thereby produced.

Next, this dimer gas of the starting material is introduced into the decomposition section 12. In the decomposition section 12, the thus introduced gas of the starting material is heated to its decomposition temperature, and preferably, to a temperature in the range of 600 to 750° C., and in particular, to 650 to 700° C. to thereby decompose the gas of the starting material into a monomer gas.

The thus produced monomer gas of the starting material is then introduced into the evaporation chamber 13, which is maintained at the predetermined degree of vacuum, and preferably, at 10 to 50 mTorr, and in particular, 20 to 35 mTorr. When the introduced gas of the starting material becomes in contact with the substrate, polymerization of the starting material takes place at the interface, and the polymer film is thereby produced.

The polymer obtained as described above is the one represented by the following structural formula (B-II):

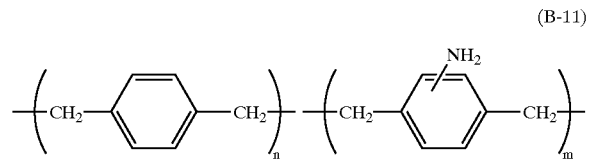

(B-11)

wherein m and n are independently an integer, and n may be 0.

The thus formed polymer film may have a thickness corresponding to one molecule. The polymer film, however, may typically have a thickness of about 0.3 to 10 μm.

In the vapor deposition, the binder-containing layer may be also formed in the predetermined pattern by using a mask corresponding to such predetermined pattern. Use of such mask enables a highly accurate formation of the binder-containing layer in the predetermined pattern so that attachment of the probe or specimen, for example, the DNA to the undesired part and remaining of such substance as a garbage can be prevented. Decrease in the S/N induced by such garbage is thereby avoided.

A bio chip having the DNA binder-containing layer obtained according to the second aspect of the present invention exhibits good binding ability with the probe DNA, and accordingly, this bio chip is less likely to experience peeling of the probe in the step of washing and the like, and efficient use of the substances is thereby enabled.

Bio Chip

The substrate preferably comprises a transparent glass, silicone, polyethylene terephthalate, cellulose acetate, bisphenol A polycarbonate or other polycarbonate, polystyrene, polymethyl methacrylate, or other polymer. Among these, use of a glass or silicone is preferable in view of the ease of surface treatment and ease of analysis using a fluorescent scan system. Use of a glass plate having a silica surface layer is also preferable. The substrate may preferably have a thickness in the range of 100 to 2000 μm. It is to be noted that use of a resin material, such as the polymer as those described above, is also preferable in view of the binding between the binding layer of the present invention and the substrate, and it is also preferable to dispose a coupling agent between the binding layer of the present invention and the substrate.

Two types of DNA fragments may be used for the probe depending on the purpose of the assay. In assaying gene expression, use of a polynucleotide such as cDNA, a part of the cDNA, and EST is preferable. These polynucleotide may have unknown function. However, the polynucleotide is generally prepared by means of PCR using cDNA library, genomic library, or the entire genome for the template on the basis of the sequence registered in the data base (hereinafter referred to as "PCR product"). The polynucleotide may be the one which is not amplified by PCR. In order to assay mutation or polymorphism of the gene, various oligonucleotides corresponding to the mutation and the polymorphism are preferably synthesized on the basis of the reference known sequence. In assaying the nucleotide sequence, 4n (n: length of the nucleotide) types of the oligonucleotides are preferably synthesized for use. The DNA fragment may preferably have a known nucleotide sequence.

The spotting of the DNA fragments is preferably accomplished by dispensing the aqueous solutions of the DNA fragments in an aqueous medium in a plastic plate, and dripping the dispensed aqueous solution onto the substrate by using a spotter.

The number of the DNA fragments spotted is preferably in the range of $10^2$ to $10^5$ types/cm$^2$ of the substrate surface. The amount of the DNA fragments is preferably in the range of 1 to $10^{-15}$ moles and up to several ng in weight. As a result of such spotting, the aqueous solutions of the DNA fragment will be immobilized on the surface of the substrate in the form of dots which are arranged at an interval of 0 to 1.5 mm, and most preferably 100 to 300 μm. The size of one dot is preferably such that the diameter is in the range of 50 to 300 μm. The amount of the DNA fragment spotted is preferably in the range of 100 pL to 1 μL, and most preferably in the range of 1 to 100 nL.

In the present invention, the immobilization of the DNA to the amino group may be accomplished by any method, for example, by utilizing electrostatic interaction, or by utilizing a UV crosslinker.

After the spotting and optional drying, the chip is preferably washed for the removal of the DNA which failed to be immobilized.

The dots which are formed on the surface of the substrate as described above are substantially, round in shape. Stability of the dot shape is important particularly in the case of quantitative analysis of the gene expression or one base mutation.

The life of the thus produced chips are considerably long. In the case of a cDNA chip having cDNAs immobilized thereon, the chip has a life of several weeks while the chip may have an even longer life in the case of an oligodeoxynucleotide chip wherein oligodeoxynucleotides are immobilized. Such bio chip is utilized in the monitoring of gene expression, determination of the nucleotide sequence, assay of mutation, assay of polymorphism, and the like. The principle of the detection is hybridization of the immobilized probe with the labeled target nucleic acid.

Preferably, the target nucleic acid used for the sample is a sample of DNA fragment or RNA fragment having an unknown sequence and unknown function.

In the case of assaying the gene expression, the target nucleic acid is preferably the one isolated from an eukaryotic cell or tissue sample. When the target is the genome, the target nucleic acid is preferably the one isolated from a tissue other than erythrocyte. The tissue other than erythrocyte may preferably be peripheral blood lymphocyte, skin, hair, sperm, or the like. When the target is mRNA, the sample is preferably extracted from a tissue sample wherein the mRNA is expressed. The mRNA is preferably made into a labeled cDNA by incorporating the labeled dNTP ("dNTP" designates a deoxyribonucleotide wherein the nucleotide is adenine (A), cytosine (C), guanine (G), or thymine (T)) by means of reverse transcription. The dNTP used is preferably dCTP in view of the chemical stability. The amount of the mRNA required for one hybridization is preferably up to several μg although such amount may differ according to the liquid amount and the labeling method. It is to be noted that, when the DNA fragments on the bio chip are oligodeoxynucleotides, molecular weight of the target nucleic acid is preferably reduced before the assay. In the case of a prokaryotic cell, labeling of the entire RNA is preferable in view of the difficulty of the selective extraction of the mRNA.

In order to assay the mutation or the polymorphism, the target nucleic acid is preferably prepared by conducting PCR of the target region in the reaction system containing the labeled primer or the labeled dNTP.

The labeling methods include those using RI and those not using RI among which the latter non-RI methods being the preferred. The non-RI methods include fluorescent labeling, biotin labeling, and chemiluminescent labeling methods, and use of a fluorescent labeling method is preferred. Any fluorescent substance may be used as long as the substance is capable of bonding to the base moiety of a nucleic acid. However, use of a cyanine dye (for example, Cy3 and Cy5 of Cy Dye TM series), rhodamine 6G reagent, N-acetoxy-$N_2$-acetylaminofluorene (AAF), and AAIF (iodine derivative of AAF) are the preferred.

The hybridization is preferably accomplished by preparing an aqueous solution having the labeled target nucleic acid dissolved or dispersed therein, dispensing the aqueous solution on a plastic plate, and spotting the aqueous solution onto the bio chip that has been produced as described above. The amount spotted is preferably in the range of 1 to 100 nL. The hybridization is preferably conducted at a temperature in the range of room temperature to 70° C. and for a period of 6 to 20 hours. After the completion of the hybridization, the bio chip is preferably washed with a mixture of a surfactant and a buffer solution for the removal of the target nucleic acid which failed to hybridize. Exemplary surfactants include sodium dodecylsulfate (SDS). Exemplary buffer solutions include citrate buffer solution, phosphate buffer solution, borate buffer solution, Tris buffer solution, and Good's buffer solution, and use of citrate buffer solution is preferred.

The characteristic feature of the hybridization using a bio chip is the drastically reduced amount of the labeled nucleic acid. As a consequence, a careful selection of the optimal conditions is required for the hybridization depending on the length of the DNA fragment immobilized on the substrate and the type of the labeled target nucleic acid. In the case of assaying gene expression, the hybridization is preferably conducted at low stringency for a long time to thereby enable detection of a gene which has been expressed at a low level. In the case of assaying one base mutation, the hybridization is preferably conducted at a high stringency for a short time. In the hybridization using a bio chip, two types of target nucleic acids labeled with different fluorescent substances may be also used on one bio chip at the same time to thereby enable comparison or quantitative evaluation of the expressed amount.

EXAMPLES

Example A-1

<Synthesis of Monobromo-[2,2]-paracyclophane>

To a solution of 75 g of [2,2]-paracyclophane and 3.7 L of methylene chloride were added 3.0 g of reduced iron and 0.3 g of water, and 73.5 g of bromine was added to this mixture while stirring the mixture at a temperature of up to 30° C. The reaction was tracked by means of gas chromatography, and a solution of 80 g of sodium thiosulfate in 1.5 L of water was added when the unreacted [2,2]-paracyclophane decreased to 3.0%.

Next, the methylene chloride layer was separated, and after adding aqueous sodium hydroxide, methylene chloride was removed by distillation. The precipitate was separated by filtration, washed, and dried to obtain 105.5 g of crude crystal. The crystal was dissolved in 320 g of toluene with heating, and the solution was filtered while the solution was still hot to thereby remove the insoluble content. The toluene solution was concentrated and cooled. The precipitate was collected by filtration and dried to obtain 81.0 g of monobromo-[2,2]-paracyclophane.

This compound had the composition as described below when it was analyzed by gas chromatography.

| [2,2]-paracyclophane | 4.0% |
|---|---|
| monobromo-[2,2]-paracyclophane | 94.9% |
| dibromo-[2,2]-paracyclophane | 1.0% |

<Synthesis of Monocyano-[2,2]-paracyclophane>

To 35 of the thus obtained compound were added 16.4 g of copper cyanide and 200 ml of N-methylpyrrolidone, and the mixture was stirred at 195 to 205° C. for 20 hours. To this mixture was then added 1.0 L of 10% aqueous ammonia, and the precipitate was collected by filtration, washed, and dried to obtain 38.9 g of crude crystal. The crystal was dissolved in 30 g of acetone with heating, and the solution was filtered while the solution was still hot to thereby remove the insoluble content. The solution was evaporated to dryness to thereby obtain 26.4 g of crude crystal. The crystal was purified by sublimation and recrystallized in 60 g of ethanol to obtain a 22.3 g of a compound mainly comprising monocyano-[2,2]-paracyclophane.

This compound had the composition as described below when it was analyzed by gas chromatography.

| [2,2]-paracyclophane | 3.0% |
|---|---|
| monocyano-[2,2]-paracyclophane | 94.5% |
| dicyano-[2,2]-paracyclophane | 1.8% |

<Synthesis of Monoaminomethyl-[2,2]-paracyclophane>

To 500 g of tetrahydrofuran that had been cooled in an ice bath was added 15 g of lithium aluminum hydride, and to this mixture, a solution of 15 g of the compound obtained in 2 in 100 g of tetrahydrofuran was added dropwise at a temperature of up to 20° C.

Stirring at room temperature was continued until the content of the unreacted monocyano-[2,2]-paracyclophane decreased to 1% or less in gas chromatographic analysis. After the completion of the reaction, the solution was cooled in an ice bath, and 100 g of water was added to the solution. The precipitated insoluble content was removed by filtration, and the filtrate was evaporated to dryness. To the resulting crude crystal was added 300 g of methanol, and the mixture was heated for dissolution. The solution was then cooled to room temperature, and the insoluble content was removed by filtration. The filtrate was evaporated to dryness to obtain 13.8 g of compound mainly comprising monoaminomethyl-[2,2]-paracyclophane.

This compound had the composition as described below when it was analyzed by gas chromatography.

| [2,2]-paracyclophane | 3.0% |
|---|---|
| monoaminomethyl-[2,2]-paracyclophane | 94.1% |
| diaminomethyl-[2,2]-paracyclophane | 1.1% |

<Formation of Polymer Thin Film>

A vapor deposition system as shown in FIG. 1 comprising an evaporation section 11, a decomposition section 12, and a deposition section 13 was prepared.

In the vapor deposition system shown in FIG. 1, monoaminomethyl-[2,2]-paracyclophane which is the solid evaporation material having the structure of the formula (A-I) was introduced in the evaporation section 11. When the temperature of the evaporation section 11 was elevated to 100 to 150° C., the evaporation material vaporized into the dimer gas having the structure as shown below. The starting material in the form of a gas was thereby produced.

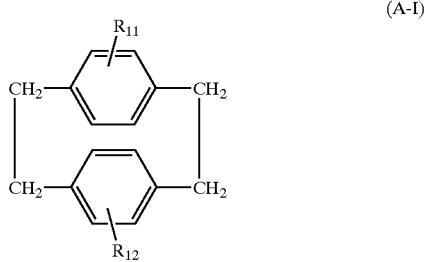

(A-I)

In the formula A-I, $R_{11}$ and $R_{12}$ independently represent —$CH_2NH_2$ group or H, and at least one of the $R_{11}$ and $R_{12}$ is —$CH_2NH_2$ group. It is also acceptable that both $R_{11}$ and $R_{12}$ are —$CH_2NH_2$.

Next, the starting material in the form of a dimer gas was introduced into the decomposition section 12. In this decomposition section 12, the gaseous starting material introduced was heated to its decomposition temperature of 700° C. for the decomposition of the gaseous starting material into the monomer gas as shown in the following scheme.

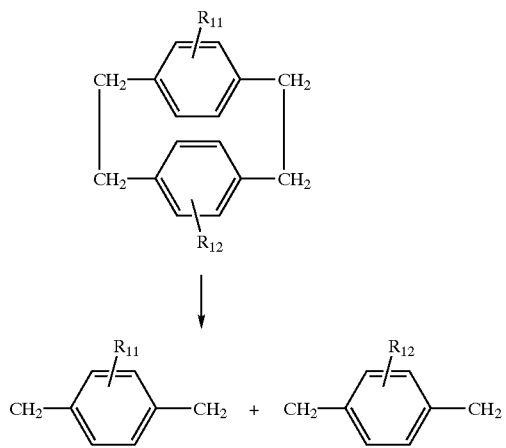

Next, the resulting starting material in the form of a monomer gas was introduced into the evaporation chamber 13, which was maintained at the degree of vacuum of 30.1 mmTorr at the maximum. The gaseous starting material polymerized on the glass substrate surface, and the polymer film represented by the structural formula as described below was formed. It is to be noted that the surface of the glass substrate may be treated with a silane coupling agent to thereby improve the bonding between the polymer film and the glass substrate.

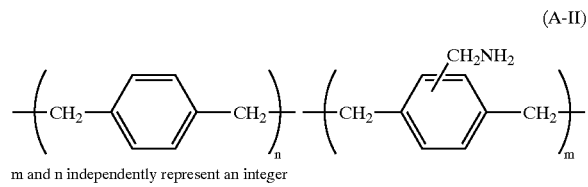

(A-II)

m and n independently represent an integer

Figure 2:
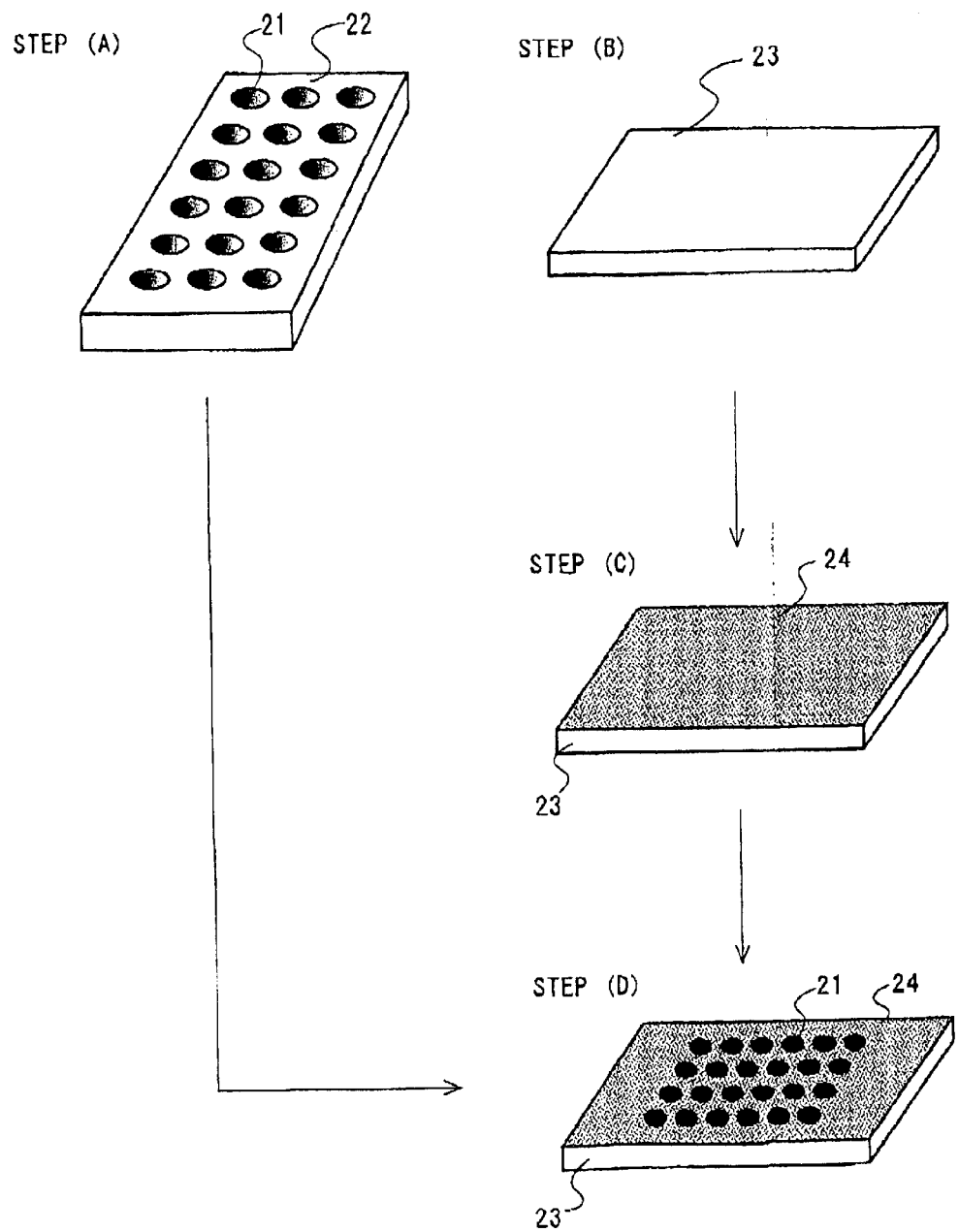
FIG. 2 is a view schematically illustrating the process of the bio chip production.

Next, a 100 μM aqueous solution of a 30 mer synthetic DNA labeled at the 5' terminal with Cy3 or Cy5 was prepared for use as the probe DNA. The probe DNA in the microplate 22 was attached to the pin, and this probe DNA on the pin was brought in contact with the glass plate 23 having the polymer film formed thereon for spotting. This procedure was repeated until the completion of the spotting of the probe DNA to thereby produce the bio chip as shown in FIG. 2 STEP (D).

For the immobilization of the DNA to the amino group, immobilization utilizing electrostatic interaction and the immobilization using a UV crosslinker were attempted. In the case of the method utilizing the electrostatic interaction, the substrate was left in a humidistat chamber overnight, and then dried overnight at 80° C. In the case of the method utilizing the UV crosslinker, the substrate was left in the UV crosslinker for 2 minutes. The sample was then washed overnight with distilled water.

The resulting sample was observed for the fluorescence before the DNA immobilization (immediately after spotting) and after the immobilization and the washing to thereby evaluate immobilization state of the probe.

In the case of the samples of the present invention, formation of uniform spots were confirmed after the spotting and after the UV irradiation. After the washing, excessive DNA was occasionally found in the area other than the spotted area to indicate easy and firm attaching of this binder layer with the DNA. In view of such situation, when the bio chip of the present invention is to be used in practice, it is desirable to remove the background noise by masking the area of the bio chip other than the area to be spotted, by depositing the binding layer with the use a mask of predetermined pattern, or by limiting the area of the fluorescence observation to the spotted area.

Example B-1

<Synthesis of 4-nitro-(2,2)-paracyclophane>

First, 20 g of (2,2)-paracyclophane was heated under reflux with 800 g of glacial acetic acid (partly insoluble). After cooling the solution to 75° C., fuming nitric acid (d=1.50) was promptly added dropwise, and the mixture was stirred for 5 minutes after the completion of the addition. At this occasion, the solution temperature increased to 85° C. The reaction mixture was then poured into ice water, and the resulting precipitate was recovered by filtration, washed with alkaline solution, and then, with water (yield of the crude crystal: 9.2 g).

The resulting crude crystal was extracted with isopropyl ether, and isopropyl ether was distilled off the extract. The residue was recrystallized from methanol to produce 5.3 g of 4-nitro-(2,2)-paracyclophane.

<Synthesis of 4-amino-(2,2)-paracyclophane>

Next, 5.0 of the resulting 4-nitro-(2,2)-paracyclophane was dissolved in 200 g of toluene, and to this solution was added 6 g of iron powder, 70 ml of ethanol, and 30 ml of water. The mixture was heated under reflux, and hydrochloric acid solution prepared by diluting 5 ml of concentrated hydrochloric acid with 20 ml of 50% ethanol was added dropwise for 1 hour with heating under reflux, and the heating under reflux was continued for another 4 hours. After the completion of the reaction, the reaction product was filtered, and the filtrate was extracted with hydrochloric acid. The resulting precipitate was recovered by filtration and dried (yield of the crude crystal: 4.1 g). The resulting precipitate was sublimed. The sublimate was mixed with ethanol, and the mixture was heated under reflux. After cooling, the resulting crystal was collected by filtration, and dried to obtain 3.7 g of 4-amino-(2,2)-paracyclophane represented by the structural formula (B-I). The structure was confirmed by gas chromatography and mass spectroscopy.

<Formation of Binder-containing Layer>

A vapor deposition system as shown in FIG. 1 comprising an evaporation section 11, a decomposition section 12, and a deposition section 13 was prepared.

In the vapor deposition system shown in FIG. 1, 4-amino-(2,2)-paracyclophane having the structure of formula (B-I)

in solid form (the evaporation material) was introduced in the evaporation section 11. When the temperature of the evaporation section 11 was heated to 100 to 150° C., the evaporation material became vaporized and a dimer gas having the structure as shown below was generated. This gas was used as the gaseous starting material.

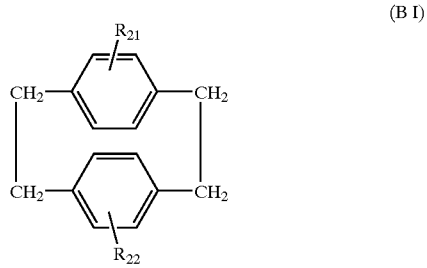

(B I)

In the formula B-I, $R_{21}$ and $R_{22}$ independently represent —$NH_2$ group or H, and at least one of the $R_{21}$ and $R_{22}$ is —$NH_2$ group. It is also acceptable that both $R_{21}$ and $R_{22}$ are —$NH_2$.

Next, the starting material in the form of the dimer gas was introduced into the decomposition chamber 12. In this decomposition chamber 12, the gaseous starting material introduced was heated to its decomposition temperature of 700° C. for decomposition of the gaseous starting material into monomer gas.

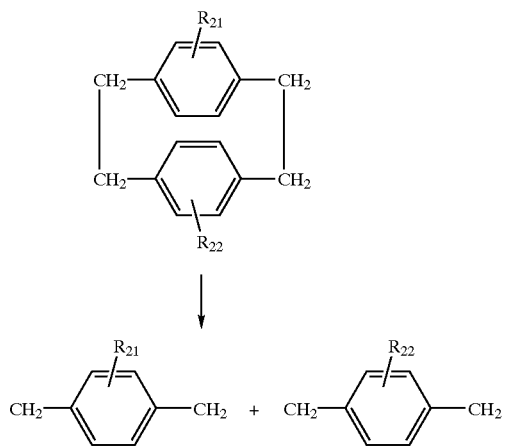

Figure 3:
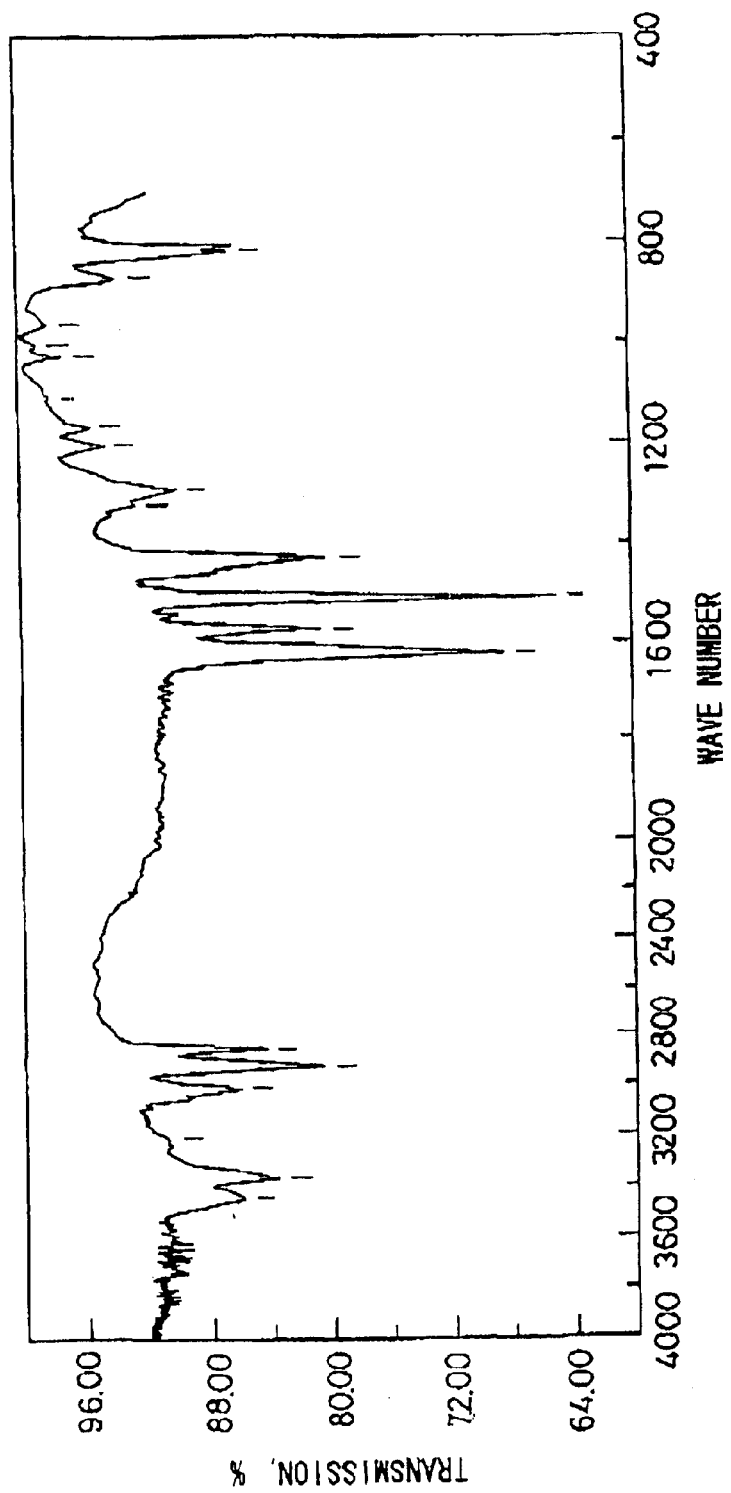
FIG. 3 is a graph showing infrared absorption spectrum of the polymer film produced in Example A-1.

Next, the resulting starting material in the form of a monomer gas was introduced into the evaporation chamber 13, which was maintained at the degree of vacuum of 30.1 mmTorr at the maximum. The gaseous starting material polymerized on the glass substrate surface, and the polymer film represented by the structural formula as described below was formed. Infrared absorption spectrum of the resulting polymer film is shown in FIG. 3.

(B-II)

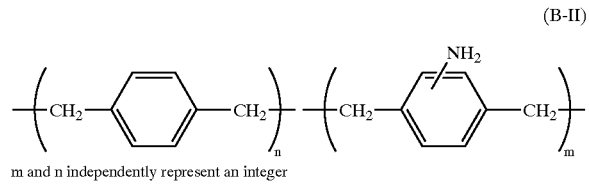

m and n independently represent an integer

Next, the probe DNA in the microplate 22 was attached to the pin, and this probe DNA on the pin was brought in contact with the glass plate 23 having the polymer film formed thereon for spotting. This procedure was repeated until all probe DNA in the microplate 22 had been spotted to thereby produce the bio chip as shown in FIG. 2 STEP (D).

The hybridization of the bio chip was accomplished by placing both the bio chip having the probe DNA bonded to the glass plate and the sample DNA that had been labeled with a fluorescent substance in a hybridization solution for hybridization. The hybridization solution was a mixed solution comprising formaldehyde, SSC (NaCl, trisodiumcitrate), SDS (sodium dodecyl sulfate), EDTA (ethylenediamidetetraacetic acid), distilled water, and the like, and the mixing ratio could vary depending on the nature of the DNA used.

Next, the sample DNA labeled with the fluorescent substance remaining on the glass plate was washed in a water tank or the like to thereby remove the sample DNA which failed to bind to the probe DNA.

In this process, almost all of the probe DNA that had been bonded to the substrate remained in the substrate without becoming peeled off, and it was confirmed that the DNA is not peeled off the bio chip in the washing procedure.

Hybridization was then detected by exciting the fluorescent label on the sample DNA which became bonded to the probe DNA with the light energy from the predetermined light source, and detecting the light emitted by the excitation of the fluorescent label with a photosensor such as CCD.

It was then confirmed that the desired hybridization had been properly accomplished, and the S/N ratio was at a sufficient level.

Example B-2

In Example B-1, the binder-containing layer was formed by using a mask of predetermined pattern to thereby form a binder-containing layer having the pattern corresponding to the spotting pattern.

The bio chip was produced by repeating the procedure of Example 1 except that the DNA probe in the microplate 22 was coated instead of spotting, and the chip was then washed with distilled water and dried.

The resulting bio chip was evaluated as in the case of Example 1, and it was then found that the S/N had been improved with no garbage.

MERITS OF THE INVENTION

As described above, the present invention provides a polymer thin film which is useful as a substrate for immobilizing a histocompatibility-imparting agent, an immunosuppressive agent, a bioreaction suppressive agent, or the like, and which can be used in imparting biocompatibility; its production method; and a bio chip wherein loss of probe and sample substances in the washing has been reduced to realize efficient use of such probe and sample.

Japanese Patent Application Nos. 2001-146675 and 2002-011707 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A bio chip comprising a substrate and a binder-containing layer formed on the substrate, and wherein said binder-containing layer comprises a polymer thin film which at least comprises a compound having the following structural unit (A-II):

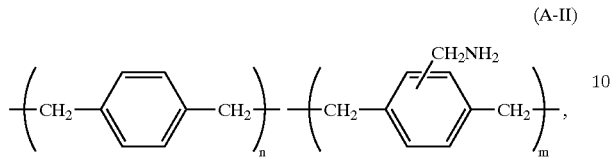
(A-II)

wherein m and n independently represent an integer, or a compound having the following structural unit (B-II):

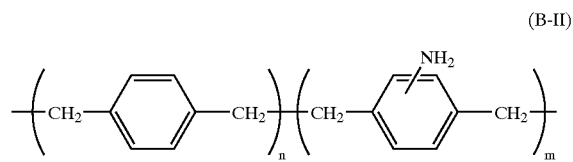
(B-II)

wherein m and n independently represent an integer, and wherein said binder-containing layer has a probe DNA bonded thereto.

2. The bio chip as claimed in claim 1, wherein said binder-containing layer is formed by vacuum deposition.

3. The bio chip as claimed in claim 1, wherein said binder-containing layer is formed with a pattern by means of masking.

4. A method for producing a bio chip as claimed in claim 1, comprising the steps of:

evaporating and heating a starting material represented by the following structural formula (A-I):

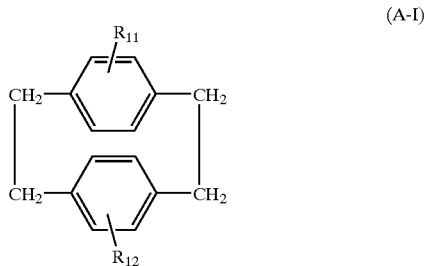
(A-I)

wherein $R_{11}$ and $R_{12}$ independently represent —$CH_2NH_2$ group or H, and at least one of the $R_{11}$ and $R_{12}$ is —$CH_2NH_2$ group, or by the following structural formula (B-I):

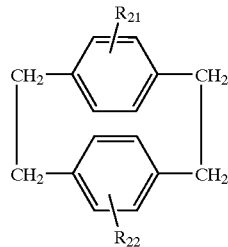
(B-I)

wherein $R_{21}$ and $R_{22}$ independently represent —$NH_2$ group or H, and at least one of the $R_{21}$ and $R_{22}$ is —$NH_2$ group, to bring the material in the form of a monomer; and introducing the heated material into a vacuum deposition chamber maintained at a predetermined degree of vacuum to deposit and polymerize the monomer on the substrate to thereby form the binder-containing layer, and binding a probe DNA to said binder-containing layer.

5. The bio chip as claimed in claim 2, wherein said binder-containing layer is formed with a pattern by means of masking.

6. The bio chip as claimed in claim 1, wherein said substrate comprises transparent glass, silicone or a polymer.

7. The bio chip as claimed in claim 6, wherein said polymer is selected from polyethylene terephthalate, cellulose acetate, bisphenol A polycarbonate, other polycarbonate, polystyrene, polymethyl methacrylate or other polymer.

8. The method as claimed in claim 4, wherein said binder-containing layer is formed by vacuum deposition.

9. The method as claimed in claim 4, wherein said binder-containing layer is formed with a pattern by means of masking.

10. The method as claimed in claim 8, wherein said binder-containing layer is formed with a pattern by means of masking.

11. The method as claimed in claim 4, wherein said substrate comprises transparent glass, silicone or a polymer.

12. The method as claimed in claim 11, wherein said polymer is selected from polyethylene terephthalate, cellulose acetate, bisphenol A polycarbonate, other polycarbonate, polystyrene, polymethyl methacrylate or other polymer.

* * * * *